UNITED STATES PATENT OFFICE.

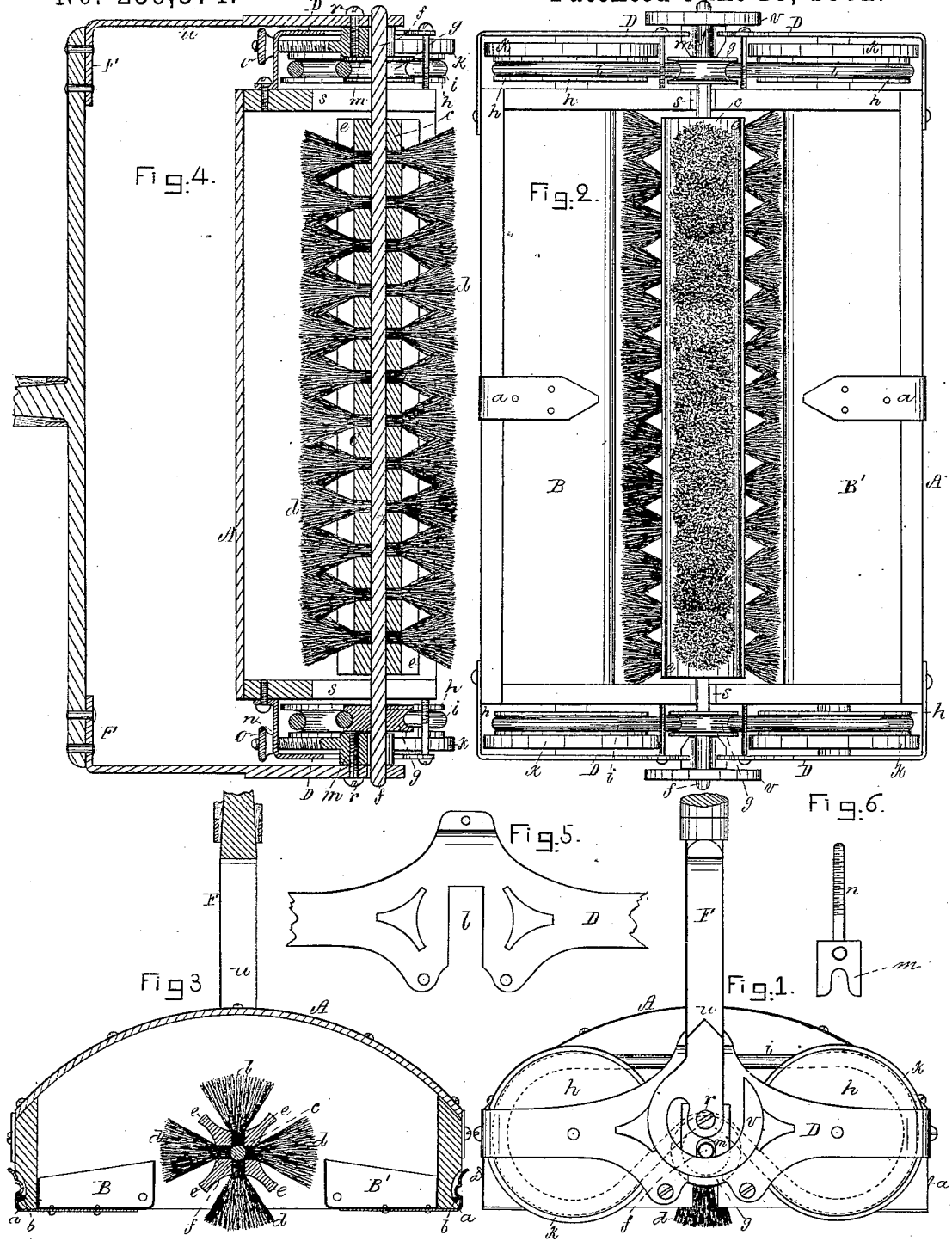

ROBERT H. EDDY, OF CHICAGO, ILLINOIS.

CARPET-SWEEPER.

SPECIFICATION forming part of Letters Patent No. 259,374, dated June 13, 1882.

Application filed April 14, 1882. (No model.)

*To all whom it may concern:*

Be it known that I, ROBERT HENRY EDDY, of Chicago, in the county of Cook, of the State of Illinois, have invented a new and useful Improvement in Carpet-Sweepers; and I do hereby declare the same to be described in the following specification and represented in the accompanying drawings, of which—

Figure 1 is an end elevation, Fig. 2 an under side view, and Fig. 3 a transverse and median section, of a sweeper containing my invention, the nature of which is defined by the claims as presented. Fig. 4 is a section of it taken through its brush, lengthwise thereof. Figs. 5 and 6 are hereinafter described.

The case A of this carpet-sweeper contains in its lower part two dust receivers or pans, B B', arranged in manner as represented, each of which, at or near its inner edges, is pivoted to the ends of the case. At its middle each pan is furnished with a spring-catch, $a$, to latch upon a projection, $b$, arranged in the case as shown. Between these dust-receivers, and at the middle of the case, is a rotary combined fan and brush, C, its body $c$ having a series of ranges, $d$, of bristles, and a series of fan-blades, $e$, extended from it in manner as shown. Each journal $f$ of the said rotary brush has fixed on it one of two grooved wheels, $g$, over and in which and about two other grooved bearing-wheels, $h$ $h$, an elastic endless belt, $i$, extends. These bearing-wheels have india-rubber or other suitable yielding tires, $k$, and are arranged to turn on pivots or screws projecting from the end of the case.

Affixed to the said case at its opposite ends are two journal-box supporters, D D, which are formed and arranged as represented. At its middle each of these supporters is slotted vertically, as shown at $l$, and particularly in Fig. 5, which is a side view of one of the said supporters, the slot of which is open at its lower end. Adapted to the supporter, so as to be capable of sliding vertically within and out of its slot $l$, is the journal-box $m$, which opens downward, as shown in side view in Fig. 6. From each journal-box a screw, $n$, having a nut, $o$, on it, as shown, extends upward through the supporter. Such screw and nut serves to raise the box against the pressure of the elastic belt tending to move it downward.

The handle is represented as projecting from a bail, F, which spans the case A, and is pivoted to both of the journal-boxes, as shown at $r$ $r$. Each prong $u$ of the bail is provided with a curved hook, $v$, arranged to project from it and around its lower part or end in manner as represented, and to hook upon the next adjacent brush-journal in manner as shown.

The case A, at the middle of each of its ends, is slotted to receive the journals of the brush, the slots being represented at $s$ $s$, and each being open at its lower end. By turning the case around within the bail sufficiently the elastic force of the belts will cause the brush to be discharged from the case, as well as from the boxes and hooks connected with the bail; but when the parts of the sweeper are in their normal or proper positions for use the hooks of the bail hold the brush-journals within their boxes against the retractive force of the elastic driving-bands acting against the median grooved wheels fixed on the journals of the brush.

From the above it will be observed that it becomes a very easy matter to detach the brush from its boxes and case or to apply it thereto, as occasion may require.

It will also be seen that means of adjusting the brush vertically within the case is provided as the bristles may become worn by use.

When the sustaining-wheels of the case are resting on a carpet and the case is moved thereupon, such wheels will be revolved, and by means of the elastic driving-belts and the grooved wheels of the journals of the brush will cause such brush to be put in rapid revolution.

As the brush may impinge against and raise the dust from the carpet the blades of the fan will meet it and aid in raising it, and will throw it upward within the case, in order for it to fall or be caught within one or both of the pans.

By means of the rotary combined fans and brush I avoid the usual wear of carpets incident to the use of a brush without any such fan-blades, as the brush with them to properly operate is not required to be borne so strongly against the carpet to gather up the dust.

The fan-blades, by running close to and clear of the carpet, suck or draw the dust upward and aid in casting it into the case and into one or both the pans.

Having thus described my improved carpet-sweeper, what I claim therein as of my invention is as follows, viz:

1. The brush-journal boxes and their slotted guides or supporters, in combination with the bail pivoted to the said boxes and provided with hooks arranged therewith and to hook upon the journals of the brush, substantially as set forth.

2. The case, slotted at its ends and provided with the revoluble brush and its driving-wheels and elastic belts, as set forth, in combination with the brush-journal boxes and their slotted guides or supporters, and with the bail pivoted to the said boxes and provided with hooks arranged therewith and to hook upon the journals of the brush, all being arranged and adapted substantially as set forth.

3. The combination of the adjusting screws and nuts with the brush-journal boxes and their supporting-guides, the revoluble brush, its driving-wheels and elastic belts, and with the bail pivoted to the said boxes and provided with hooks to hook upon the journals of the said brush, all being arranged with the case and adapted to operate substantially as set forth.

4. The revoluble brush and its fan-blades, arranged as described, in combination with the case and its dust-receiving pans, such combined brush and fan-blades being provided with mechanism for revolving it in the case, as set forth.

ROBERT HENRY EDDY.

Witnesses:
JAS. SHORTALL,
FRANK COMPTON.